United States Patent [19]
Shunichi

[11] 3,925,969
[45] Dec. 16, 1975

[54] SUGAR CANE HARVESTING MACHINE
[76] Inventor: Okamura Shunichi, 108 Kamoike Bldg., No. 2691, Korimoto, Kagoshima, Japan
[22] Filed: Dec. 20, 1973
[21] Appl. No.: 426,946

[52] U.S. Cl. ................................. 56/13.9; 56/62
[51] Int. Cl.² ........................................ A01D 45/10
[58] Field of Search ......... 56/13.9, 13.8, 13.5, 11.9, 56/13.3, 16.5, 53, 62, 14.3

[56] References Cited
UNITED STATES PATENTS

| | | | |
|---|---|---|---|
| 798,534 | 8/1905 | Sharp | 56/13.9 |
| 1,710,611 | 4/1929 | Duncan | 56/13.9 |
| 1,741,602 | 12/1929 | Athey | 56/13.9 |
| 1,903,335 | 4/1933 | Falkiner | 56/60 |

Primary Examiner—Russell R. Kinsey

[57] ABSTRACT

A device that is power driven and may be controlled by a single operator to travel longitudinally along a raised earth ridge from which sugar cane grows in either an upright or bent position or combination thereof. As the device traverses the ridges, the sugar cane is sequentially cut and then defoliated. The cut and defoliated sugar cane is then deposited in a suitable receiving means that travels concurrently with the device along the ridges from which the sugar cane grows.

12 Claims, 4 Drawing Figures

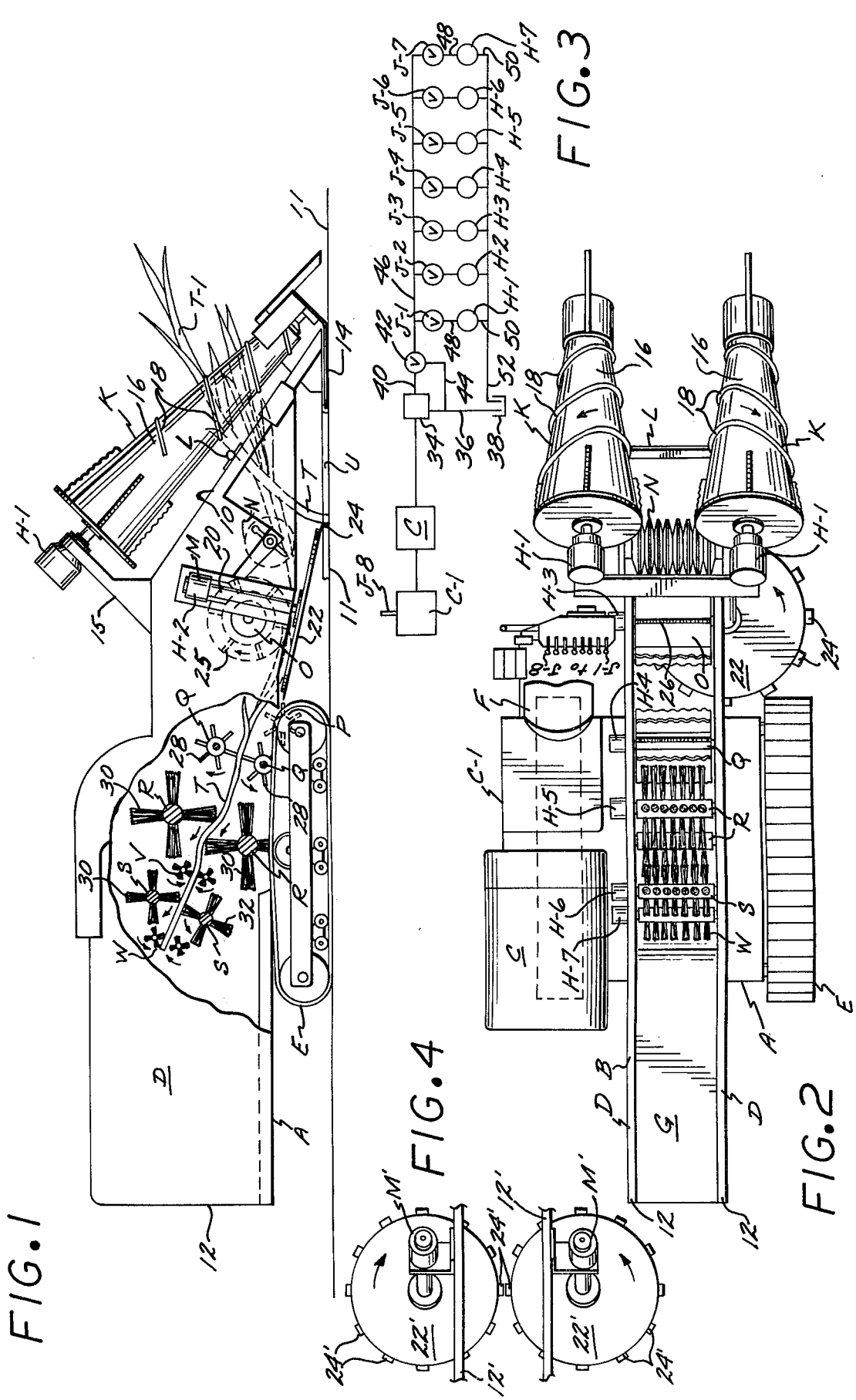

SUGAR CANE HARVESTING MACHINE

BACKGROUND OF THE INVENTION

1. Field of the Invention

Sugar cane harvesting machine.

2. Description of the Prior Art

In the past, it has been common practice to harvest sugar cane by the use of large and expensive reaping machines, and the foliage on the cut sugar cane thereafter being burned. This burning of the sugar cane to defoliate the same has the disadvantage that it causes inversion of sugar in the cane due to extreme heat, and decreases the extraction rate of sugar by 2 to 3 percent. The above described method of defoliating sugar cane is objectionable in that the burning of the foliage gives rise to smoke and fumes that contaminate the atmosphere, and such burning has been banned in certain parts of the world.

The harvesting and defoliating of sugar cane presents numerous problems. Sugar cane is normally planted in a line along high earth ridges having grooves on both sides thereof, and the distance between the grooves generally being in the neighborhood of 1.0 to 1.3 meters. The ridge height is commonly between 20 to 50 centimeters. The stock portion of the sugar cane may vary substantially in diameter. This variation in diameter of sugar cane is also troublesome in the harvesting thereof. Another problem encountered in harvesting of sugar cane is the position of the cane prior to the latter being cut. In the United States, excluding the Florida district, the sugar cane normally grows in an upright position. On the other hand, almost all of the sugar cane in the Florida district, as well as in Japan and Formosa, grows in a bent over position, due to the influence of wind thereon. Due to this variation, in the growth positioning of sugar cane it has been difficult by the use of previously available machines to defoliate the sugar cane at the time it was harvested.

A major object of the present invention is to provide a device that is power driven and may be controlled by a single operator to harvest sugar cane that is growing in either an upright or bent over position, that may vary substantially in diameter in the stock portions thereof, with the defoliating of the sugar cane being carried out concurrently with the harvesting thereof, and without the necessity of burning the foliage or cutting the sugar cane into short pieces to remove the foliage therefrom. The cutting of sugar cane into short pieces causes oxidation of the sugar into inverted sugar and decreases the extraction rate.

Another object of the invention is to provide a sugar cane harvesting machine that has a relatively simple mechanical structure, requires a minimum of maintenance attention, can be operated by personnel after but a limited period of instruction, and one that can be retailed at a sufficiently low price as to encourage the widespread use thereof in the harvesting of sugarcane.

A further object of the invention is to provide a sugar cane harvesting machine that defoliates the sugar cane without the necessity of burning the foliage and in so doing polluting and contaminating the atmosphere.

SUMMARY OF THE INVENTION

The invention may be used by a single operator to harvest and defoliate sugar cane growing on raised, elongate, laterally separated ridges of earth both when the sugar cane is standing upright as well as when in bent positions. The device is illustrated in the drawings as including a vehicle assembly that comprises an elongate frame that includes two laterally separated side walls that have forward and rearward ends. An engine is supported from the frame and drives rotatable, laterally spaced, supporting members that are illustrated in the drawings as being endless tractor tracks. The tracks straddle the ridge from which the sugar cane is growing. The frame supports a seat for the operator as well as means for receiving the cut and defoliated sugar cane. The frame has at least first, second, third, fourth, fifth and sixth power means supported therefrom, with these power means being manually controllable by the operator by means located adjacent the seat on which he is mounted.

First rotatable means are supported in fixed positions adjacent the forward ends of the side walls and are driven by the first power means engaging the sugar cane as the invention moves forwardly along the ridge to raise the bent sugar cane to a first position.

The frame on the forward end portion thereof rigidly supports a horizontal push bar that serves to move the upright sugar cane as well as sugar cane that has been raised to a first position, to a second position where the sugar cane may be cut. A rotatable cutting assembly driven by the second power means occupies a fixed position relative to the forward end of the frame. The cutting assembly includes a disk that is slightly inclined to the horizontal, and the disk rigidly supporting a number of circumferentially spaced cutter blades that not only cut the sugar cane adjacent the top of the ridge, but directs the sugar cane that has been cut rearwardly relative to the frame.

The invention also includes second rotatable means for removably engaging the sugar cane cut by the cutting assembly, and minimizes the tendency of the cut sugar cane to move laterally as the cut sugar cane is directed rearwardly relative to the frame.

A horizontal roller is resiliently and rotatably supported between the side walls above the cutting assembly and is driven by the third power means. The roller cooperates with the cutting assembly and the second rotatable means to guide the sugar cane that has been cut rearwardly relative to the side walls with a minimum of lateral movement. Cut sugar cane supporting means are preferably provided rearwardly of the second rotatable means and cutting assembly, and are disposed between the side walls of the invention.

A pair of first horizontal, vertically spaced rollers are provided that are concurrently driven by the fourth means and the directions of rotation of the rollers being such that the most adjacent portions thereof both move rearwardly. The first pair of rollers are rotatably supported between the side walls rearwardly of the supporting means, and the first pair of rollers of such structure as to resiliently grip cut sugar cane of varying diameters therebetween. The first pair of rollers move the cut sugar cane passing therebetween rearwardly relative to the sidewalls.

A pair of second horizontal, vertically spaced brush supporting rollers, that are concurrently driven by the fifth power means are provided, with the second pair of rollers rotatably supported between the side walls rearwardly of the first pair of rollers, and the second pair of rollers having the cut sugar cane discharged therebetween from the first pair of rollers. The most adjacently disposed portions of the second pair of rollers both move rearwardly.

The second pair of rollers have circumferential speed substantially greater than the longitudinal speed at which the cut sugar cane is moved rearwardly by the first pair of rollers, and the second pair of brush supporting rollers defoliating the cut sugar cane moving rearwardly therebetween due to the differential in the circumferential speed of the second pair of rollers relative to the rearward longitudinal speed of the sugar cane as it passes therebetween.

A pair of third horizontal, vertically spaced, brush supporting rollers are provided that are concurrently driven by the sixth power means, and which third rollers receive the cut defoliated sugar cane therebetween from the second pair of brush supporting rollers. The third pair of brush supporting rollers are rotated at a speed substantially less than that of which the cut and defoliated sugar cane is moving rearwardly, and the third pair serving to slow the rearward speed of the cut and defoliated sugar cane to the extent that it will drop downwardly onto the cut and defoliated sugar cane to the extent that it will drop downwardly onto the cut and defoliated sugar cane receiving means. The cut and defoliated sugar cane may then be removed from the receiving means by conventional equipment, such as a power operated conveyer belt or the like.

BRIEF DESCRIPTION OF THE DRAWINGS

FIG. 1 is a side elevational view of the invention for concurrently cutting and defoliating sugar cane;

FIG. 2 is a top plan view of the invention shown in FIG. 1;

FIG. 3 is a diagrammatic view of the power means used in actuating the invention; and FIG. 4 is an alternate form of cutter assembly.

DESCRIPTION OF THE PREFERRED EMBODIMENT

The implement A as shown in FIGS. 1 and 2 includes a frame B on which an engine C is mounted that drives a transmission C-1. The frame B includes two parallel laterally spaced side walls D that have first forward ends 10 and rearward ends 12. Two rotatable frame supporting members E are provided, which are illustrated in the drawings as being endless tractor tracks that are laterally separated to the extent that they may straddle a ridge of earth from which sugar cane grows.

The supporting members E are power driven by conventional means from the transmission C-1. The frame B supports a seat F on which the operator (not shown) is supported. The frame B on the rearward portion thereof supports a cut defoliated sugar cane receiving means G which is defined by spaced side walls D and a bottom as may best be seen in FIG. 2.

Power means H-1 to H-7, inclusive are provided on the implement A to operate various driven components 3. Manually operated control means J-1 to J-7 are also provided on the implement A and as may be seen in FIG. 2 are located adjacent seat F to permit the operator (not shown) to manipulate the control means as required. The control means J-1 to J-7 inclusive are also shown in FIG. 3. The implement A as may be seen in FIG. 1 includes two laterally spaced shoes 14 that slidably engage the ground surface and are supported from the forward ends 10 of the side wall D. The ground surfaces 11 engaged by the shoes 14 are on opposite sides of a ridge U from which the sugar cane T grows. The forward end portion 10 of the side walls D also support brackets 16 that have the first power means H-1 mounted thereon. The pair of laterally spaced shoes 14 and laterally spaced brackets 15 serve to rotatably support two upwardly and rearwardly extending rotatable means K for lifting bent sugar cane T to a first position as the implement A moves longitudinally along the ridge U from which the sugar cane T grows.

The first rotatable means K are two tapered rollers 16 that are laterally spaced from one another and rotate in the directions shown by arrows in FIG. 2. Although the rollers 16 are shown as tapered, they may be straight walled if desired. The rollers 16, as may be seen in FIG. 1, have longitudinally spaced, helical ribs 18 extending outwardly from the peripheral surface thereof, and these ribs engage the foliage T-1 of the sugar cane to raise the sugar cane upwardly to a first position as shown in solid line in FIG. 1. The ribs 18 may be in the configuration of a helix as shown in FIG. 2. When the tapered rotatable means K are rotating, the portions thereof most adjacent to one another are rotating upwardly.

A sugar cane cutting assembly M is supported from the lower portion of one of the side walls D as may be seen in FIG. 2, with the assembly being driven by the second power means H-2. The second power means H-2 drives a downwardly extending shaft 20 that has a disk 22 rigidly secured to the lower end thereof, and the disk having a number of circumferentially spaced cutting blades 24 extending outwardly from the periphery thereof as best seen in FIG. 2. The disk 22 is supported at a slightly inclined angle relative to the horizontal as may be seen in FIG. 1. A generally horizontal push bar L is rigidly secured to the forward end portion of the sidewall D, and the push bar serving to move sugar cane T that grows upright, as well as sugar cane that has been raised to the first position, to a second position, with this second position being assumed by the sugar cane just prior to it being engaged by the cutting blades 24.

A second rotatable member N as may best be seen in FIGS. 1 and 2 is rotatably supported from the frame B in a horizontal position. The second roller N has a number of longitudinally spaced circumferential grooves 26 therein that removably engage the sugar cane T after being cut, and prevents the sugar cane being moved laterally as the rotating blades 24 tend to move the cut sugar cane rearwardly.

The blades 24 not only serve to cut the sugar cane T, but tend to move the cut sugar cane rearwardly relative to the side walls D. A roller O is horizontally disposed between the side walls D and is resiliently supported therefrom by conventional means (not shown) with the roller O being driven by the third power means H-3. The roller O has a number of longitudinally extending circumferentially spaced, resilient blades 25 extending outwardly therefrom, and these blades in cooperation with the disk 22 resiliently grip sugar cane T having stalks of varying diameters. The gripped sugar cane T is moved rearwardly relative to the side walls D. The outer edges of the blades 26 may be of a wavy or serrated configuration to more easily engage the sugar cane stalks of varying diameters. The roller O in cooperation with the rotating disk 22 prevent substantial lateral movement of the cut sugar cane T as it moves rearwardly between the side walls D.

A horizontal cut sugar cane support P is provided which may be in the form of a roller that is rotatable supported in a horizontal position between the side walls D and is located just rearwardly of the disk 22. A pair of first horizontal vertically spaced rollers Q are provided that are concurrently driven by the fourth power means H-4 in such directions that the adjacently disposed portions thereof move rearwardly.

The first pair of rollers Q are rotatably supported between the side walls D rearwardly of the supporting means P. The rollers Q each have a number of longitudinally extending, circumferentially spaced, resilient blades 28 projecting outwardly therefrom that frictionally grip the cut sugar cane T as the latter passes between the rollers, and the rotating fingers moving in such a direction as to direct the engaged cut sugar cane T rearwardly. The blades 28 may have wavy outer edges to permit sugar cane T of varying diameters to be frictionally engaged thereby and moved rearwardly as shown in FIG. 1.

A pair of second horizontal, vertically spaced, brush supporting rollers R are provided that are rotatably driven by the fifth power means H-5, and these rollers being rotatably supported between the side walls D rearwardly of the pair of first rollers Q as may be seen in FIG. 1. The second pair of rollers R support a number of circumferentially spaced brushes 30. The second pair of rollers R rotate faster than the first pair of rollers Q and as a result the brushes 30 move relative to the cut sugar cane T to defoliate the same. A third pair of rollers S also bearing brushes 30 is rotatably supported rearwardly of second pair of rollers R. The third pair of rollers S rotate slower than the second pair of rollers R and slow down the rearward rate of movement of the cut sugar cane to the extent it will fall by gravity onto the sugar cane receiving means G. The defoliated sugar cane receiving means G may be a horizontal platform that extends between the lower portions of the sidewalls D adjacent the rearward ends 12 thereof as shown in FIGS. 1 and 2.

Should it be desired, fourth and fifth horizontal vertically spaced pairs of rollers V and W may be rotatably supported between the side walls D as shown in FIG. 1, with these pairs of rollers having resilient brushes thereon, and the pairs of rollers V and W rotating in opposite directions to that of the second and third pairs of rollers R and S to assure that the defoliated foliage T-1 is removed from the cut sugar cane T, prior to the cut sugar cane dropping onto the receiving means G. The fourth and fifth pairs of members V and W are rotated by power means (not shown).

Although the rotatable components of the invention may be driven by various power means, it is convenient to utilize the power means shown in FIG. 3. The transmission C-1 is controlled by a control unit J-8, to vary the speed of the tractor tracks E and thus guide the invention along a desired ridge from which the sugar cane T grows.

The engine C may be used to drive a hydraulic pump 34 as shown in FIG. 3, which pump has the suction thereof connected by a conduit 36 to a hydraulic reservior 38. The discharge from the pump 36 is through a conduit 40 to a pressure relief valve 42. The excess pressure of the pressure relief valve 42 is connected by a conduit 44 to the suction line 36. The discharge of the valve 42 is connected to a header 46 from which laterals extend to manual controls J-1 to J-7 inclusive that are manually operated valves, and are operable when the operator (not shown) is situated on the seat F as illustrated in FIG. 2. Discharge from the valves J-1 to J-7 is through consuits 48 to hydraulic motors H-1 to H-7 inclusive, and discharge from the hydraulic motors H-1 to H-7 is through conduits 50 that are connected to a header 52 that returns the hydraulic fluid to the reservoir 38. When all of the control valves J-1 to J-7 are closed, hydraulic fluid discharge from the pump 34 is bypassed through the relief valve 42 and conduit 44 back to the suction lines 36. The hydraulic motors are the first to seventh power means H-1 to H-7 previously described. The transmission C-1 is controlled by a manual control handle J-8 as shown in FIG. 3.

An alternate form of the device is shown in FIG. 4 in which two cutting assemblies M' are employed rather than a single cutting assembly M as shown in FIG. 2. The cutting assemblies M' are each substantially identical to cutting assembly M, but employ a disk 22' of smaller diameter than the disk 22 previously described. As may be seen in FIG. 4 the cutting assemblies M' are supported from opposite longitudinal sides of the frame B, with one of the disks 22' being driven in a clockwise direction and the other in a counter clockwise direction. The two disks 22' have the adjacently disposed portions thereof rotating rearwardly. The size of the disks 22' and the lateral spacing thereof is such that the cutting blades 24' thereon will not contact one another as the disks 22' are concurrently rotated. The two cutting assemblies M' serve the same function as the cutting assembly M previously described.

The use and operation of the invention A in harvesting and defoliating sugar cane has been explained previously in detail and need not be repeated.

I claim:

1. A device that may be used by a single operator to harvest and defoliate sugar cane growing on raised elongate laterally separated ridges of earth both when said sugar cane is standing upright and when in bent positions, said device including:
    a. a vehicle assembly that comprises
        1. an elongate frame that includes two laterally separated sidewalls that have forward and rearward ends;
        2. an engine supported from said frame;
        3. two rotatable laterally spaced supporting members that straddle one of said ridges and support said frame thereabove, with said supporting members driven by said engine;
        4. a seat for said operator supported from said frame;
        5. defoliated sugar cane receiving means disposed in a fixed position relative to said frame adjacent said rearward ends of said sidewalls;
        6. first, second, third, fourth, fifth and sixth power means supported from said frame;
        7. manually operable control means adjacent said seat to permit said operator to selectively control the speed of rotation of said supporting members to guide said vehicle and the operation of said first to sixth power means inclusive;
    b. first rotatable means rotatably supported in fixed positions adjacent said forward ends of said sidewalls and driven by said first power means, said first rotatable means engaging said sugar cane as said device moves forwardly to raise sugar cane to a first position;
    c. a horizontal push bar that occupies a fixed position adjacent said forward ends of said side walls for moving upright sugar cane and sugar cane that has been raised to said first position to a second position where said sugar cane may be cut;

d. rotatable cutting means driven by said second power means that is supported from said frame rearwardly of said push bar, said cutting means including at least one disk slightly inclined to the horizontal, and said disk rigidly supporting a plurality of circumferentially spaced cutter blades that not only cut said sugar cane adjacent the ground but direct the cut sugar cane rearwardly relative to said sidewalls;

e. second rotatable means for removably engaging sugar cane cut by said rotatable cutting means and minimizing the tendency of said sugar cane to move laterally as said sugar cane moves rearwardly relative to said sidewalls;

f. a horizontal roller resiliently and rotatably supported between said sidewalls above said cutting assembly and driven by said third power means and cooperating with said cutting assembly and said second rotatable means to guide said sugar cane that has been cut rearwardly relative to said sidewalls with minimum lateral movement;

g. cut sugar cane supporting means disposed between said sidewalls and rearwardly of said second rotatable means;

h. a pair of first horizontal vertically spaced rollers that are concurrently driven by said fourth power means to have adjacent portions of said rollers move rearwardly, said first pair of rollers rotatably supported between said sidewalls rearwardly of said supporting means, with said first pair of rollers of such structure as to resiliently grip cut sugar cane of varying diameters therebetween, and said first pair of rollers moving said sugar cane passing therebetween rearwardly at a first speed;

i. a pair of second horizontal, vertically spaced, brush supporting rollers that are concurrently driven by said fifth power means to have adjacent portions of said rollers move rearwardly, said second pair of rollers having said cut sugar cane discharge therebetween from said first pair of rollers, said second pair of brush supporting rollers defoliating said cut sugar cane moving rearwardly therebetween due to the differential in the circumferential speed of said second pair of rollers to the rearward longitudinal speed of said sugar cane; and j. a pair of third horizontal, vertically spaced brush supporting rollers that are concurrently driven by said sixth power means to have adjacent portions of said rollers move rearwardly and that receive the cut defoliated sugar cane therebetween from said second pair of brush supporting rollers, said third pair of brush supporting rotatably supported between said sidewalls rearwardly of said second pair of brush supporting rollers, said third pair of brush supporting rollers rotating at a speed substantially less than that of said second pair of brush supporting rollers, and said third pair of rollers moving said cut defoliated sugar cane rearwardly at a speed that is such that said cut defoliated sugar cane will drop to said defoliated sugar cane receiving means by gravity when freed from said third pair of brush supporting rollers.

2. A device as defined in Claim 1 which in addition includes:

k. a pair of fourth horizontal, vertically spaced, brush supporting rollers rotatably supported between said sidewalls rearwardly of said second pair of brush supporting rollers and forwardly of said third pair of brush supporting rollers, said fourth pair of brush supporting rollers driven in a direction opposite to said second pair of brush supporting rollers to remove defoliated foliage from said cut sugar cane as the latter is forced rearwardly between said fourth pair of brush supporting rollers by said second pair of brush supporting rollers.

3. A device as defined in claim 1 in which each of said brush supporting rollers in said second pair thereof includes:

1. a cylindrical rigid body; and m. a plurality of circumferentially spaced wire brushes that extend outwardly therefrom, with said wire brushes of such length and the rotation of said cylindrical bodies being such that as said bodies rotate concurrently the outer end portions of said brushes alternately extend into the circumferential spaces between the brushes on the oppositely disposed rigid body to subject said cut sugar cane passing between said rigid bodies to a transverse bending action to obtain maximum contact of said brushes with the foliage on said sugar cane to defoliate said foliage therefrom.

4. A device as defined in claim 1 in which said first rotatable means are a pair of laterally spaced elongate, generally cylindrical bodies that extend upwardly and rearwardly at an angle, said cylindrical bodies concurrently rotating in the opposite directions, and said cylindrical bodies as they rotate tending to move bent sugar cane upwardly therebetween to said first position.

5. A device as defined in claim 4 which in addition includes:

1. a plurality of vertically spaced arcuate ribs that extend outwardly from said cylindrical bodies and that tend to raise said bent sugar cane to said first position as said bodies and ribs rotate.

6. A device as defined in claim 1 which said first to sixth power means inclusive are a plurality of hydraulic motors, and said device in addition including:

1. a hydraulic fluid supply system powered by said engine and controlled by said control means to selectively deliver hydraulic fluid by said control means to said first to sixth power means inclusive to operate the same at a desired speed.

7. A device as defined in claim 4 which in addition includes:

1. a pair of guide shoes situated under said pair of generally cylindrical bodies, said pair of guide shoes capable of slidably engaging the ground on opposite sides of said ridge to maintain said cutting assembly at a desired vertical position relative to the roots of said sugar cane.

8. A device as defined in claim 1 in which said second rotatable means is a horizontal roller rotatably supported between said sidewalls, said rollers having a plurality of longitudinally spaced, circumferential grooves therein that removably engage said sugar cane to minimize lateral movement thereof after said sugar cane has been cut and is being moved rearwardly due to the rotation of said cutting assembly.

9. A device as defined in claim 1 in which said defoliated sugar cane receiving means is a horizontal bed that extends between said sidewalls rearwardly of said third pair of brush supporting rollers and below the latter.

10. A device as defined in claim 1 in which said two rotatable laterally spaced supporting members are two elongate endless tractor tracks that are laterally spaced sufficiently as to have one of said ridges of ground from which sugar cane grows disposed therebetween.

11. A device for harvesting and defoliating sugar cane growing on raised elongate laterally spaced ridges of earth both when said sugar cane is standing upright and when in bent over positions, said device including:
   a. an elongate frame that includes two parallel laterally separated side walls having forward and rearward ends, said frame including cut defoliated sugar cane receiving means adjacent said rearward ends of said sidewalls;
   b. first means for moving supporting said frame to permit said frame to move longitudinally along said ridges;
   c. primary power means supported by said frame for moving said frame and first means longitudinally along said ridges;
   d. first, second, third, fourth, fifth and sixth power means operatively associated with said frame;
   e. first rotatable means mounted on said frame adjacent said forward ends of said sidewalls and driven by said first power means for raising bent sugar cane to a first position;
   f. second means supported from said frame adjacent said first means for moving upright sugar cane and sugar cane in said first position to a second position;
   g. rotatable cutting means driven by said second power means for cutting said sugar cane when disposed in said first position, said cutting means rotatably supported from said frame;
   h. third rotatable means driven by said third power means that cooperate with said cutting means to direct said cut sugar cane rearwardly between said side walls with a minimum of lateral movement;
   i. fourth rotatable means that resiliently engage cut sugar cane of varying diameters and direct said sugar cane rearwardly between said sidewalls at a first speed, said fourth rotatable means driven by said fourth power means and rotatably supported between said sidewalls;
   j. rotatable brush carrying means that has a circumferential speed greater than said first speed said eighth rotatable means receiving said cut sugar cane from said seventh rotatable means and defoliating said sugar cane as the latter passes through said rotatable means, and said eighth rotatable brush means rotatably supported between said sidewalls rearwardly of said fourth rotatable means and driven by said fifth power means; and
   k. further rotatable means driven by said sixth power means that is situated rearwardly of said rotatable brush means and receives cut defoliated sugar cane therefrom, said ninth rotatable means rotatably supported between said sidewalls, and said ninth rotatable means slowing the rearward movement of the cut defoliated sugar cane to the extent that it will drop by gravity to said cut defoliated sugar cane receiving means that is situated below said ninth rotatable means and rearwardly therefrom.

12. A device as defined in claim 1 in which said rotatable cutting assembly driven by said second power means includes two laterally spaced disks slightly inclined to the horizontal that concurrently rotate in clockwise and counterclockwise directions to have adjacent portions thereof rotating rearwardly, with each of said disks rigidly supporting a plurality of circumferentially spaced cutter blades that not only cut said sugar cane adjacent the ground but direct the cut sugar cane rearwardly relative to said sidewalls.

* * * * *